UNITED STATES PATENT OFFICE.

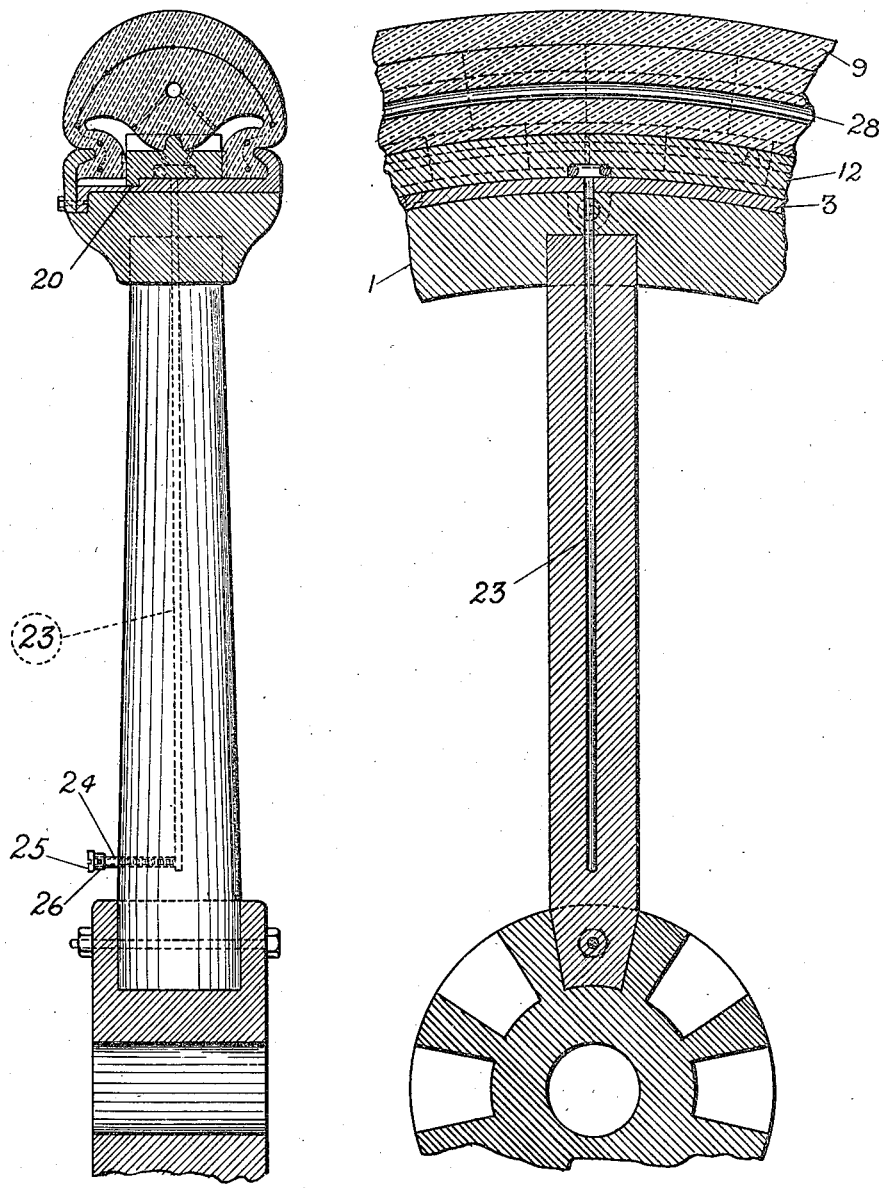

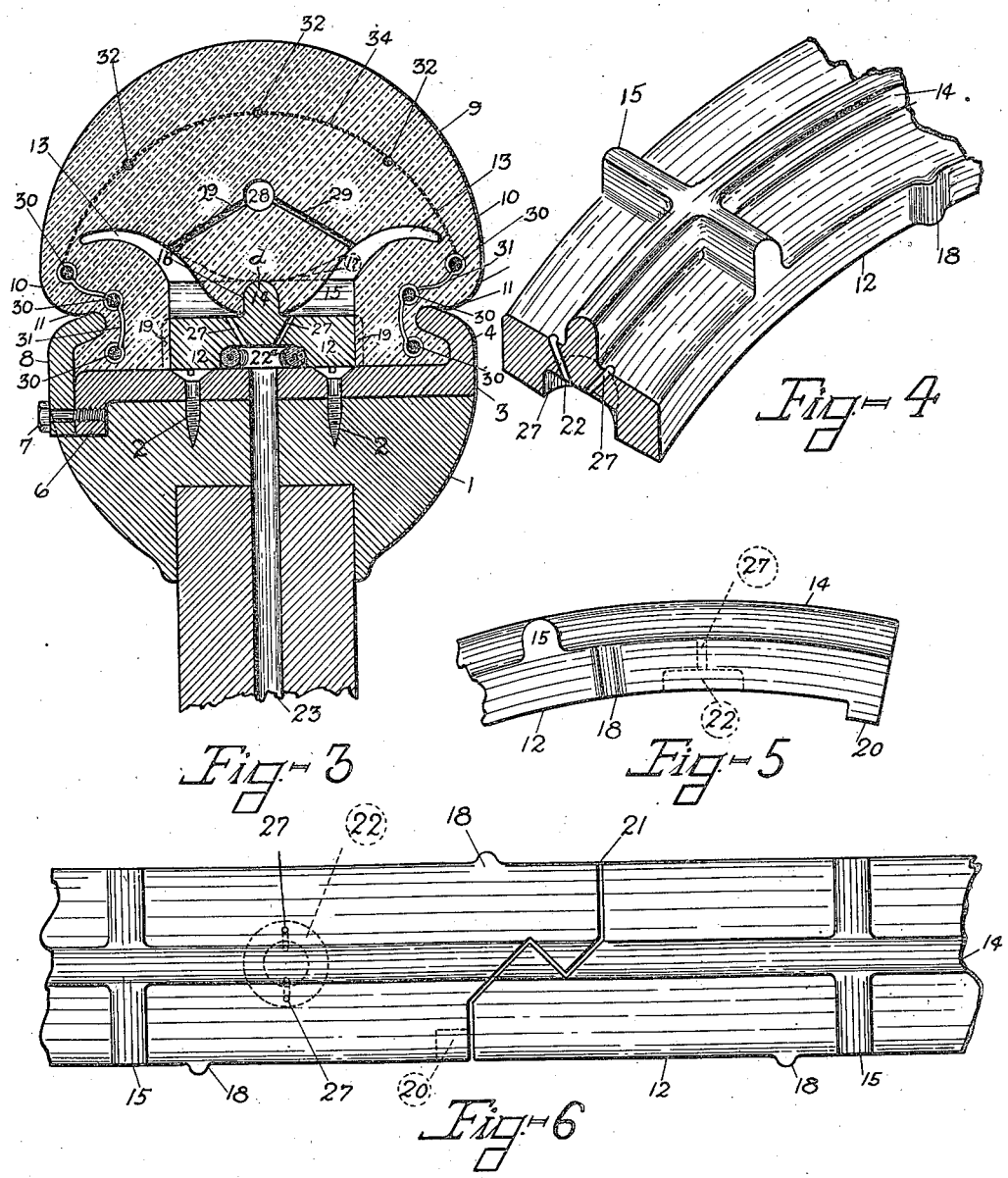

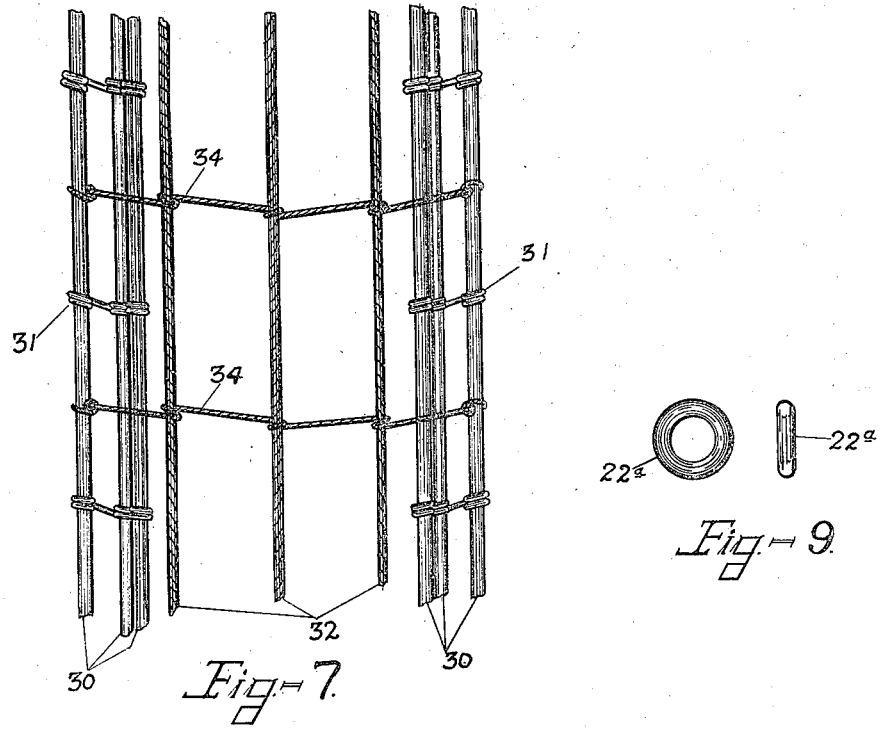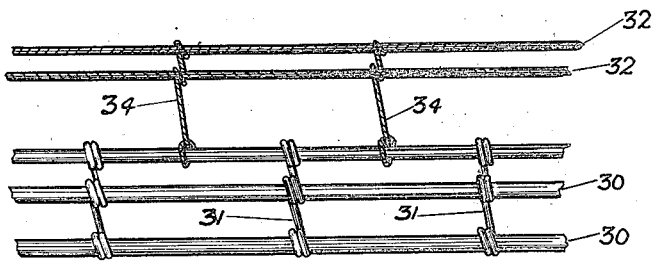

JOSEPH S. BAHEN, OF ROCK ISLAND, ILLINOIS.

CUSHION-TIRE.

1,194,120.

Specification of Letters Patent.

Patented Aug. 8, 1916.

Application filed May 3, 1915. Serial No. 25,415.

*To all whom it may concern:*

Be it known that I, JOSEPH S. BAHEN, a citizen of the United States of America, and resident of Rock Island, Rock Island county, Illinois, have invented a certain new and useful Improvement in Cushion-Tires, of which the following is a specification.

My invention relates to cushion tires for wheels of automobiles, motor trucks or the like, and has for its object to provide a tire of the resilient type, which while having the qualities of a pneumatic tire, without being susceptible to the injuries common to that tire, yet has the necessary resiliency to properly absorb shocks to which vehicles of this nature are commonly subjected when traversing ordinary roadways; which will not have the rebound of the penumatic tire and which will not be liable to collapse from long use or under heavy loads, and which will not have the hard jolt or bounce of the solid rubber tire.

Another object is to provide means for automatically ventilating the tire, whereby it is prevented from heating, a source of great annoyance and a direct cause of the rapid deterioration of the rubber; and a further object is to provide means for readily attaching and detaching the tire from the rim and yet firmly hold same against creeping or shifting with respect to the rim when in use.

With these objects in view my invention consists in certain novel features of construction and in certain parts and combinations hereinafter described and shown in the accompanying drawings in which—

Figure 1, is a transverse section of the tire and a portion of the hub of a wheel taken on a line between two spokes thereof, with the spoke shown in elevation. Fig. 2, is a longitudinal section thereof taken vertically through the spoke. Fig. 3 is an enlarged detail sectional view of the tire and a portion of the spoke. Fig. 4, is a perspective view of a portion of the retaining ring. Fig. 5 is a side elevation thereof, and Fig. 6 is a top plan view of the retaining ring showing the interlocking connection at its ends. Fig. 7 is a plan view of the reinforcing rods and cords to be embedded in the tire, showing particularly, the method of interlacing or tying same together. Fig. 8 is a side elevation thereof. Fig. 9 illustrates a packing ring used in my device.

In these drawings, in which similar reference characters refer to similar parts throughout the several views, I have illustrated the preferred form of my invention and show the same as comprising the felly 1, which is preferably of semi-circular formation so that in connection with the cushion tire the ensemble is substantially of tubular formation exteriorly.

Suitably secured to the felly as by the screws 2 is the metal rim 3, which is provided at one edge with the upwardly extending flange 4 having the inwardly turned edge 5, and which at the other edge is provided with the holding lugs 6 extending downwardly, at intervals, from its underside. These lugs are screw threaded to receive the machine screws 7 to secure the locking ring 8 in place. It will be observed that this locking ring 8 is similar in form to the flange 4 on the opposite edge of the rim. The cushion tire made of suitable material, consisting of the body portion 9 is provided with the depending wings or projections 10. The outer surface of these wings are provided with the annular grooves 11 for engagement with the inturned edges of the flange 4 and locking ring 8 while their inside vertical faces contact with the retaining ring 12.

The interior of the body portion 9 is so shaped in relation to the wings 10 as to form the cavities 13 with its center in contact with the retaining ring 12. This retaining ring, which may be made of wood or other suitable material, is provided with the longitudinally extending rib 14 and a multiplicity of transversely extending ribs 15 which engage the longitudinal groove 16 and the transverse grooves 17 formed in the tire 9. It is also provided with the vertical ribs 18 extending at intervals from the sides or edges which engage suitable depressions 19 formed on the inner faces of the wings 10. The lug 20 pendant from the ring at one end and engaging a suitable depression in the rim 3 in connection with the interlocking joint 21 at the ends of the ring prevents its longitudinal displacement or tendency to creep in relation to the rim 3, while the ribs 14, 15 and 18 engaging the grooves in the cushion tire, prevent displacement or creeping in relation thereto.

In assembling the device, the retaining ring 12 is placed in position inside of the endless tire 9 with the proper ribs and lugs engaging their respective grooves and depressions, and the tire so assembled is slipped over the rim 3 causing the inturned edge of the flange 4 to enter the annular groove 11. The locking ring 8 is then firmly screwed into place with its inturned edge entering the other annular groove 11, and as the retaining ring 12 functions as a spreader between the inner faces of the depending wings or projections 10 great pressure can be brought to bear on same by the locking ring, securing the tire in a most thorough manner to the rim 3.

On the inner face of the retaining ring 12, at diametrically opposite points, are the counter bores or circular recesses 22. The depression in the rim 3 which is engaged by the lug 20 is so positioned relative to the recess 22 as to bring same in alinement with the ends of diametrically opposite spokes of the wheel. These spokes are provided with the central opening or cavity 23 which communicates with the recesses 22 through suitable openings through the felly 1 and rim 3 as shown. The other end of the cavity communicates with the exterior of the spoke through the tube 24. This tube is provided with the cap 25 which has an opening 26 in its side registering with a similar opening in the side of the tube near its end, which openings can be thrown out of registration by the turning of the cap, for purposes that will more fully hereinafter appear. These recesses 22 also have communication with the cavities 13 in the tire 9 through the ports or passages 27 in the retaining ring 12. The tire 9 is also provided with the large circular chamber 28 running longitudinally thereof and having communication with the cavities 13 through the ports or passages 29 of which there may be any desired number.

The principal object of the cavities 13—13 and 28 is primarily, to effect the desired resiliency and remove or prevent hard rebound or bounce of the solid tire, and by providing communication between these cavities and from thence to the atmosphere through recess 22, cavity 23 and tube 24, a circulation of outside air is constantly induced throughout the tire structure, effectively preventing overheating of the rubber when the tire is in use under heavy loads for sustained periods on hot days over heated pavements. It will be observed that the transverse grooves 17 in the tire 9 do not contact with the upper surface of the transverse rib 15 of the retaining ring throughout its length, but that they are of circular formation and under normal conditions contact with these ribs at their center of length only as shown at a. The circle on which these grooves have been struck is of such a radius that when under load the circle has become straightened out, causing the groove to contact with the rib throughout its length, it will be found that the walls of the cavities 13 are substantially in contact or the cavity in a state of complete collapse, as is also the cavity or chamber 28. It is the continued contraction or collapsing of these chambers under load and their return to normal when passing from under load, alternately expelling and drawing in air that induces and maintains a constant circulation of outside air throughout the tire.

As means for reinforcing the wings 10 of the tire against rupture from lateral strains, the rods 30 may be provided. These rods may be extended continuously and longitudinally of the tire at points shown and may be tied or interlaced at intervals in their length, by the wire ties 31. In addition to these main rods the auxiliary ties 32 may be run longitudinally of the tire at points shown and tied or interlaced by the cords 34 similarly to the interlacing of the main rods 30.

To prevent air escaping from between the retaining ring 12 and rim 3, I insert the packing ring 22$^a$. To prevent the tube 24 from becoming clogged or obstructed when the tires are in use on excessively muddy roadways or when, perchance fording a stream, the caps 25 can be turned sufficiently to throw the opening 26 therein out of registration with the similar opening in the tube.

It will be observed that the advantage in placing the passage 23 in the spoke of the wheel is that the combined inlet and outlet of this passage may be located at a point distant from the rim, where it will not be liable to be clogged by mud, etc.

Having thus described my invention, what I claim as new is:

A wheel embodying a rim; an elastic tire and means for clamping the same to said rim, said tire being provided with an annular cavity and a circumferentially-extending rib projecting inwardly from the tread and provided with longitudinally and transversely extending grooves; and a retaining ring lying against and surrounding the said rim and having interlocking engagement therewith and also with the bead portions of the elastic tire, said ring being provided on its outer face with a circumferential rib and also with transverse ribs engaging the corresponding grooves formed in the inwardly-projecting rib on the elastic tire, for the purpose set forth.

Signed by me at Rock Island, Illinois, this 30th day of April, 1915.

JOSEPH S. BAHEN.